(12) United States Patent
McClelland et al.

(10) Patent No.: US 10,212,400 B2
(45) Date of Patent: Feb. 19, 2019

(54) SYSTEMS OF ACQUIRING IMAGE DATA FOR AN AUTONOMOUS WORK VEHICLE

(71) Applicants: CNH INDUSTRIAL AMERICA LLC, New Holland, PA (US); AUTONOMOUS SOLUTIONS, INC., Mendon, UT (US)

(72) Inventors: Brett Carson McClelland, Chicago, IL (US); Christopher Alan Foster, Mohnton, PA (US); Taylor Chad Bybee, Logan, UT (US); Bret Todd Turpin, Wellsville, UT (US); James Patrick Yonk, Petersboro, UT (US); Lyle Shawn Frisby, Mendon, UT (US)

(73) Assignees: CNH Industrial America LLC, New Holland, PA (US); Autonomous Solutions, Inc., Mendon, UT (US)

( * ) Notice: Subject to any disclaimer, the term of this patent is extended or adjusted under 35 U.S.C. 154(b) by 102 days.

(21) Appl. No.: 15/583,755

(22) Filed: May 1, 2017

(65) Prior Publication Data

US 2018/0316895 A1    Nov. 1, 2018

(51) Int. Cl.
*H04N 7/18* (2006.01)
*H04N 5/77* (2006.01)
*G07C 5/02* (2006.01)

(52) U.S. Cl.
CPC .............. *H04N 7/188* (2013.01); *G07C 5/02* (2013.01); *H04N 5/77* (2013.01)

(58) Field of Classification Search
CPC ............. H04N 7/188; H04N 5/77; G07C 5/02
See application file for complete search history.

(56) References Cited

U.S. PATENT DOCUMENTS

| 6,336,051 | B1 | 1/2002 | Pangels et al. |
| 6,454,036 | B1 * | 9/2002 | Airey ............... G01C 21/16 180/167 |
| 6,892,131 | B2 | 5/2005 | Coffee et al. |
| 7,421,321 | B2 | 9/2008 | Breed et al. |
| 7,451,030 | B2 | 11/2008 | Eglington et al. |
| 7,630,909 | B2 | 12/2009 | Wahlbin et al. |
| 8,311,858 | B2 | 11/2012 | Everett et al. |

(Continued)

FOREIGN PATENT DOCUMENTS

WO     2015118325 A1    8/2015

*Primary Examiner* — Nam D Pham
(74) *Attorney, Agent, or Firm* — Rebecca L. Henkel; Rickard K. DeMille (57) ABSTRACT

A controller for a work vehicle includes a processor and a memory device communicatively coupled to the processor. The memory device stores instructions that cause the processor to receive a first signal from an image capturing device, such that the first signal is indicative of image data associated with an environment of the work vehicle. Furthermore, the memory device stores instructions that may cause the processor to associate the first signal with a corresponding position of the work vehicle to generate a video log in response to a triggering event, such that the video log has a duration between a first time and a second time, and the triggering event includes a command to stop the work vehicle, a command to start a mission, a command to end a mission, a user input to override an autonomous command, a user input to override a highly automated command, detection of an obstacle, or any combination thereof.

20 Claims, 7 Drawing Sheets

(56) References Cited

U.S. PATENT DOCUMENTS

| | | |
|---|---|---|
| 8,373,567 B2 | 2/2013 | Denson |
| 8,577,703 B2 | 11/2013 | McClellan et al. |
| 8,953,933 B2 | 2/2015 | Ohtomo et al. |
| 9,141,582 B1 | 9/2015 | Brinkmann et al. |
| 9,298,575 B2 | 3/2016 | Tamari et al. |
| 9,505,494 B1 | 11/2016 | Marlow et al. |
| 2015/0172894 A1 | 6/2015 | Gabel |
| 2016/0082953 A1 | 3/2016 | Teller et al. |

* cited by examiner

SYSTEMS OF ACQUIRING IMAGE DATA FOR AN AUTONOMOUS WORK VEHICLE

BACKGROUND

The present disclosure relates generally to a system of acquiring image data for an autonomous work vehicle.

Certain work vehicles (e.g., tractors, harvesters, skid steers, or the like) may be used for plowing operations, for tillage operations, for earth moving operations, or for accomplishing other construction and/or agricultural operations. Autonomous work vehicles may be able to accomplish one or more of the above-mentioned tasks with or without operator input. For example, an autonomous work vehicle may be configured to execute a plan to till land and/or deposit seeds into the soil without an operator manually controlling the work vehicle. Currently, it may be difficult to analyze the performance of autonomous work due to limited feedback.

BRIEF DESCRIPTION

In one embodiment, a controller for a work vehicle includes a processor and a memory device communicatively coupled to the processor. The memory device stores instructions that cause the processor to receive a first signal from an image capturing device, such that the first signal is indicative of image data associated with an environment of the work vehicle. Furthermore, the memory device stores instructions that may cause the processor to associate the first signal with a corresponding position of the work vehicle to generate a video log in response to a triggering event, such that the video log has a duration between a first time and a second time, and the triggering event includes a command to stop the work vehicle, a command to start a mission, a command to end a mission, a user input to override an autonomous command, a user input to override a highly automated command, detection of an obstacle, or any combination thereof.

In another embodiment, a video system of a work vehicle, including an image capturing device that outputs a first signal indicative of image data associated with an environment of the work vehicle and a controller that includes a memory device communicatively coupled to a processor, such that the memory device stores instructions that cause the processor to receive a first signal from an image capturing device, such that the first signal is indicative of image data associated with an environment of the work vehicle. Furthermore, the memory device stores instructions that cause the processor to associate the first signal with a corresponding position of the work vehicle to generate a video log in response to a triggering event, such that the video log has a duration between a first time and a second time, and the triggering event includes a command to stop the work vehicle, a command to start a mission, a command to end a mission, a user input to override an autonomous command, a user input to override a highly automated command, detection of an obstacle, or any combination thereof.

In a further embodiment, a tangible, non-transitory, and computer-readable medium having instructions stored thereon that, when executed by a processor, cause the processor to receive a first signal from an image capturing device, such that the first signal is indicative of image data associated with an environment of the work vehicle. Furthermore, the instructions cause the processor to associate the first signal with a corresponding position of the work vehicle to generate a video log in response to a triggering event, such that the video log has a duration between a first time and a second time, and the triggering event includes a command to stop the work vehicle, a command to start a mission, a command to end a mission, a user input to override an autonomous command, a user input to override a highly automated command, detection of an obstacle, or any combination thereof.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
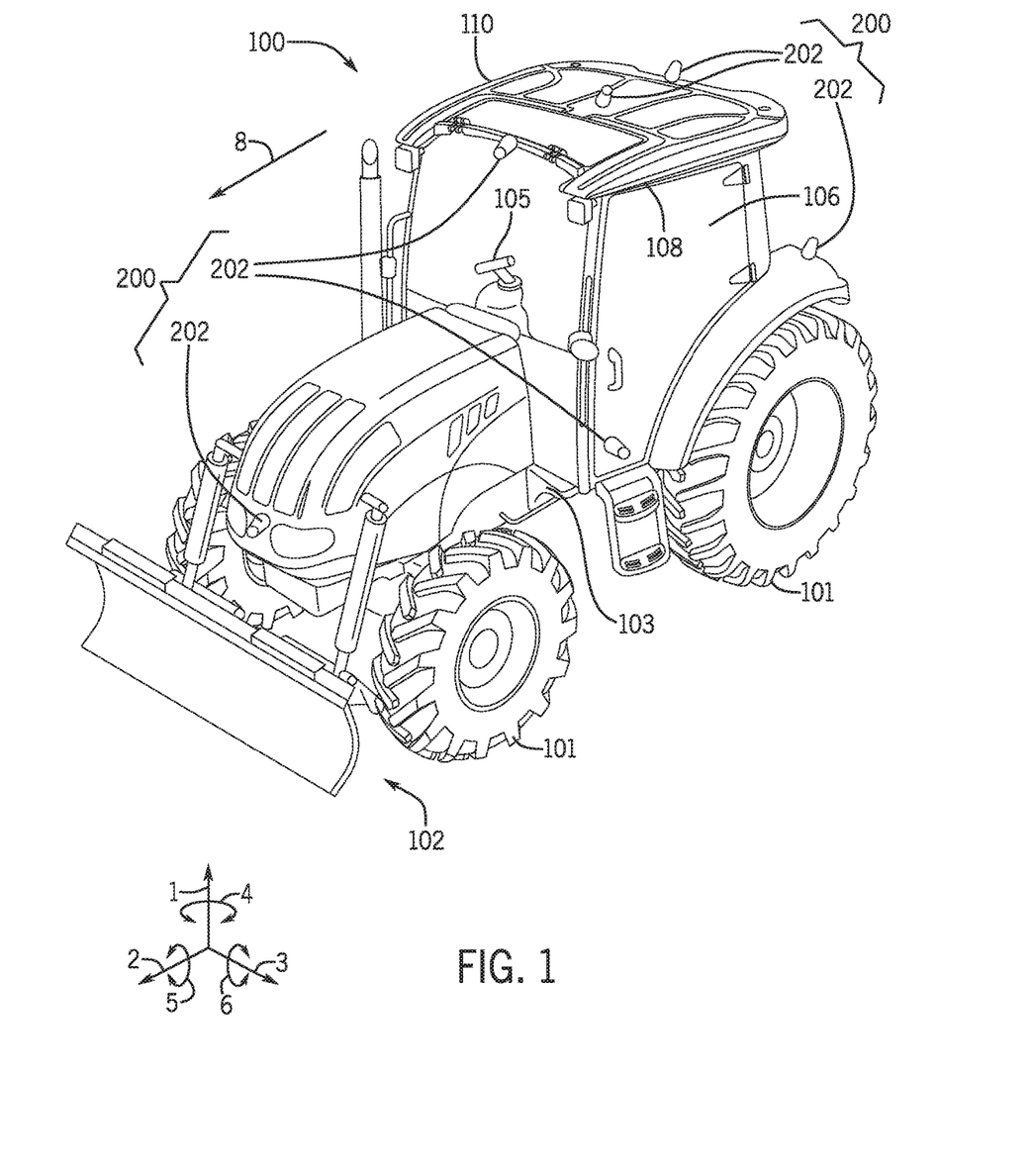
FIG. 1 is a schematic of a front perspective view of a work vehicle that includes an image capturing system, according to an embodiment of the present disclosure.

Turning to the drawings, FIG. 1 is a perspective view of an embodiment of a work vehicle 100 that includes an image capturing system 200, according to an embodiment of the present disclosure. The work vehicle 100 may be configured to execute autonomous commands. In the illustrated embodiment, the work vehicle 100 is a tractor, which includes the image capturing system 200. However, it should be appreciated that the image capturing system 200 disclosed herein may be utilized on other work vehicles, such as but not limited to autonomous on-road trucks, skid steers, harvesters, and construction equipment. In the illustrated embodiment, the work vehicle 100 includes a front tool 102 located on a front portion of the work vehicle relative to the direction of travel 8. Furthermore, in some embodiments, the work vehicle 100 may include a rear tool located on a rear portion of the work vehicle oriented opposite the direction of travel 8. For example, the work vehicle 100 may include a front tool 102, a rear tool, or any combination thereof. However, in alternative embodiments, the front tool 102 and the rear tool may be omitted. In the illustrated embodiment, the work vehicle 100 includes a cab 110 and a chassis 103. In certain embodiments, the chassis 103 is configured to support a motor (e.g., diesel engine, etc.), a hydraulic system (e.g., including a pump, valves, reservoir, etc.), and other components (e.g., an electrical system, a cooling system, a control system, etc.) that facilitate operation of the work vehicle 100. In addition, the chassis 103 is configured to support the cab 110 and wheels 101. The wheels 101 may be driven to rotate by the motor and/or by component(s) of the hydraulic system (e.g., hydraulic motor(s), etc.).

In the illustrated embodiment, the image capturing system 200 includes camera devices 202 that may capture image data of the environment of the work vehicle 100. The camera devices 202 may include any image capturing device. For example, the camera devices 202 may include a visual spectrum camera and/or an infrared camera. The camera device(s) 202 may be configured to capture individual images (e.g., at variable frame rates), video data, audio data, or a combination thereof. For example, the camera device 202 may include a microphone for capturing the audio data in addition to the visual data. The work vehicle 100 may include camera devices 202 positioned at any suitable position on the work vehicle 100. In some embodiments, the work vehicle may include one or more camera devices 202 positioned on the roof 108, such that the camera device 202 are oriented along the longitudinal axis 2 and a plurality of oblique angles. For example, the work vehicle 100 may include camera devices 202 on the front of the work vehicle 100 oriented substantially along the longitudinal axis 2 (e.g., or along suitable oblique angles), camera devices 202 on the lateral sides of the body of the work vehicle substantially oriented along the lateral axis 3, camera devices 202 on the roof 108 of the work vehicle oriented along the vertical axis 1, or a combination thereof. In some embodiments, the camera devices 202 may individually pivot or rotate about a lateral axis 3 in pitch 6, about a longitudinal axis 2 in roll 5, about the vertical axis 1 in yaw 4, or any combination thereof, for example, to capture a wider range of image data associated with the environment of the work vehicle 100. In some embodiments, the work vehicle 100 may include 1, 2, 3, 5, 10, 15, or any suitable number of camera devices 202.

In some embodiments, the camera device(s) 202 may be triggered to automatically capture image data representative of the environment of the work vehicle 100 in response to a triggering event. For example, when the work vehicle 100 receives an input (e.g., a manual input) from an operator to override an autonomous command and/or highly automated command, the image capturing system 200 may automatically generate a video log including image data captured by the camera devices 202. The video log may be stored in memory of a control system as discussed in detail below. Furthermore, a detailed discussion of the conditions that may trigger the image capturing system 200 to capture the image data and to generate the video log is included below with regard to the discussion of FIG. 4.

The cab 110 is configured to house an operator of the work vehicle 100. In the illustrated embodiment, the cab 110 includes a door 106 to facilitate ingress and egress of the operator from the cab 110. Accordingly, various manual controls, such as the illustrated hand controller 105, are positioned within the cab 110 to facilitate operator control of the work vehicle 100. As mentioned above, the work vehicle 100 may be autonomous (e.g., may operate without substantial input from an operator) and/or highly automated (e.g., may operate without certain inputs from an operator). In some embodiments, the inputs by the operator (e.g., to the hand controller 105 or any suitable user interface) may override the autonomous control and initiate manual control of the work vehicle 100. In some embodiments, the image capturing system 200 may generate a video log in response to an operator initiating manual control (e.g., such that the operator overrides the autonomous control of the work vehicle 100). For example, the manual controls may enable the operator to control rotational speed of the wheels 101 to manually adjust the speed and/or direction of travel 8 of the work vehicle 100 (e.g., via the hand controller 105). Accordingly, input to the manual control may override the autonomous commands, in which case, the image capturing system 200 may generate a video log including image data of the environment.

Furthermore, in some instances, the operator may also manually control various components of the work vehicle 100, such as the front tool. In some instances, manually controlling the various components of the work vehicle 100 may include overriding the autonomous and/or highly automated instructions and/or disabling autonomous control of the work vehicle 100. In some embodiments, the image capturing system 200 may capture and store the video log, in response to a triggering event, as discussed in detail below.

Figure 2A:
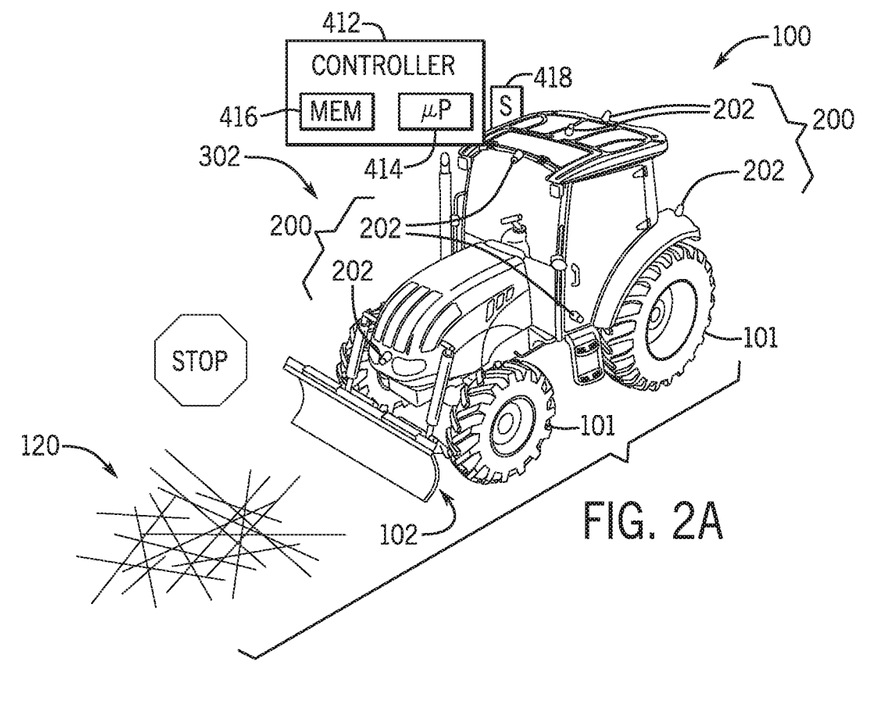
FIG. 2A is a schematic diagram of the work vehicle of FIG. 1 executing a first automated task, according to an embodiment of the present disclosure.

FIG. 2A is a schematic diagram of the work vehicle of FIG. 1 executing a first automated task, according to an embodiment of the present disclosure. As illustrated, the work vehicle 100 includes the front tool 102 and wheels 101 that may rotate to cause the work vehicle 100 move along the direction of travel 8. Furthermore, the work vehicle 100 includes a controller 412 that includes instructions stored in memory 416, such that the instructions may be executed by processor 414. In some embodiments, the controller 412 is part of the work vehicle (e.g., such that it may be housed inside the work vehicle 100. In some embodiments, the first task 302 may be automatically executed by the processor 414 of the controller 412, such that the processor 414 executes instructions for completing the first task 302, which may be stored in memory 416. For example, the work vehicle 100 may be traveling along the direction of travel 8 toward a bush 120 (or another obstacle and/or feature of interest). The controller 412 may receive an indication (e.g., from a sensor assembly 418) that the bush 120 is in the path of travel of the work vehicle 100. As illustrated, the work vehicle 412 includes the sensor assembly 418, which may include the camera devices 202. In some instances, the controller 412 may receive an indication via the sensor assembly 418 that the obstacle (e.g., bush 120) is in close proximity to the work vehicle 100. For example, the controller 412 may cause the work vehicle to execute the first task 302 in response to an indication that the bush 120 is 1 meter, 5 meters, 10 meters, or any suitable distance away from the work vehicle 100.

The first task 302 includes automatically stopping the work vehicle 100. For example, the controller 412 may receive an indication (e.g., sensor data from the sensor assembly 418) that a bush 120, or another obstacle and/or feature of interest, is in close proximity to the work vehicle 100. As such, the controller may cause the work vehicle 100 to automatically execute the first task 302 to stop. In some embodiments, the controller 412 may also cause the image capturing system 200 to capture image data over time via the camera device 202, in response to the controller 412 receiving an indication that the bush 120, or another obstacle and/or feature of interest, is in close proximity to the work vehicle 100. As such, the controller 412 may then generate a video log of image data (e.g., over time). In some instances, the controller may also store the video log of image data (e.g., over time). In other embodiments, the controller 412 may cause the image capturing system 200 capture image data via the camera device 202, generate the video log, and store the video log in response to the controller 412 receiving an indication to execute the first task 302 (e.g., to stop).

Figure 2B:
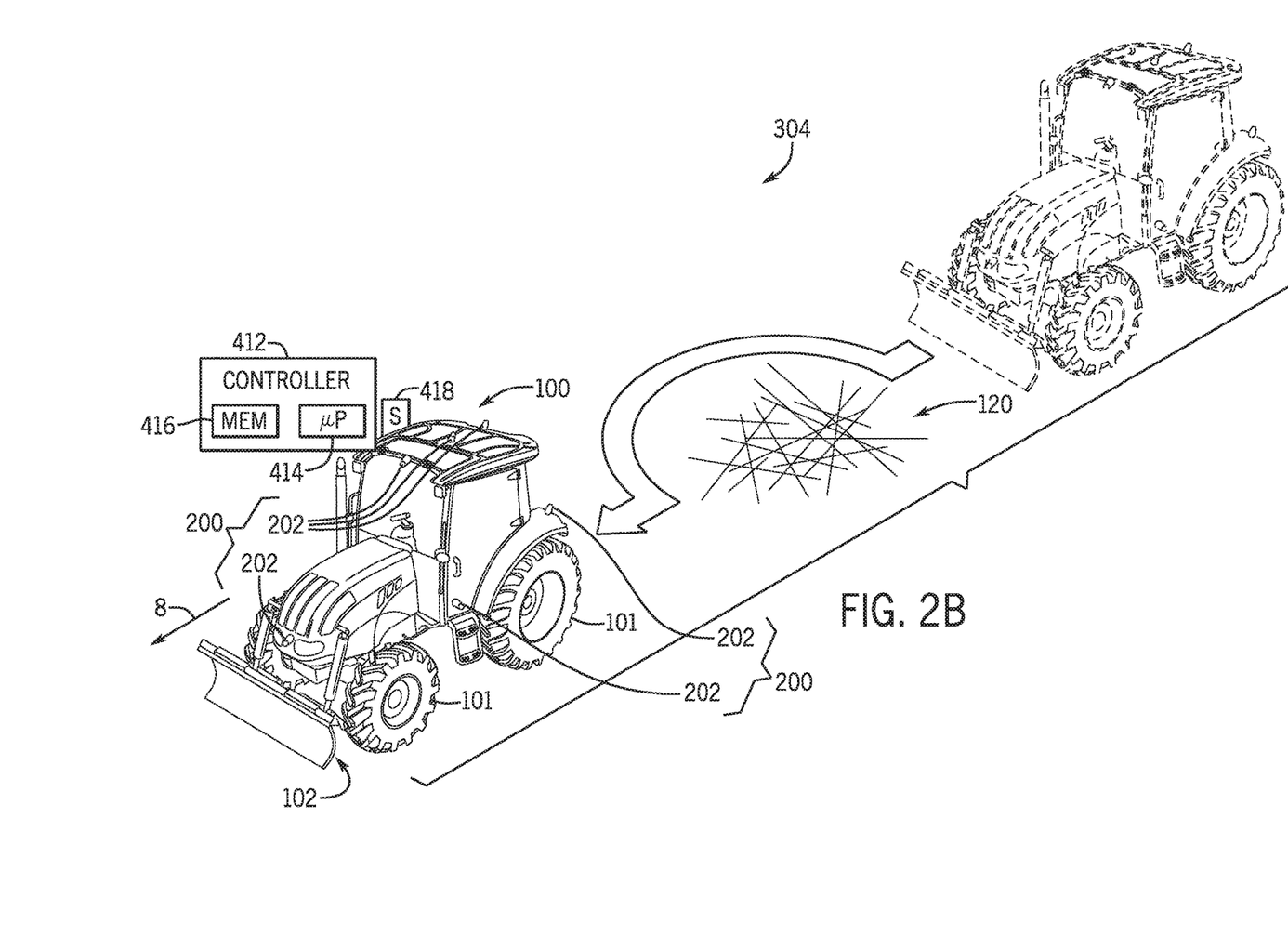
FIG. 2B is a schematic diagram of the work vehicle of FIG. 1 executing a second automated task, according to an embodiment of the present disclosure.

FIG. 2B is a schematic diagram of the work vehicle 100 of FIG. 1 executing a second automated task 304, according to an embodiment of the present disclosure. As illustrated, the work vehicle 100 includes the front tool 102 and wheels 101 that may rotate to cause the work vehicle 100 to move along the direction of travel 8. In some embodiments, the second task 304 may be automatically executed by the processor 414 of the controller 412, such that the processor 414 executes instructions for completing the second task 304, which may be stored in memory 416. For example, the work vehicle may be traveling along the direction of travel 8 toward a bush 120 or another obstacle and/or feature of interest. The controller 412 may receive an indication from the sensor assembly 418 that the bush 120 is in the path of travel of the work vehicle 100. In some instances, the controller 412 may receive an indication via the sensor assembly 418 that the obstacle (e.g., bush 120) is in close proximity to the work vehicle 100. For example, the controller 412 may cause the work vehicle 100 to execute the second task 304 in response to the controller 412 receiving an indication that the bush 120 is 1 meter, 5 meters, 10 meters, or any suitable distance away from the work vehicle 100.

The controller 412 may execute the second task 304 to cause the work vehicle to avoid the bush 120, as illustrated, (e.g., by appropriately steering the wheels 101) in response to the controller 412 receiving an indication from the sensor assembly 418 that an obstacle has been detected. For example, the controller 412 may receive an indication (e.g., sensor data from the sensor assembly 418) that a bush 120, or another obstacle(s), is in close proximity to the work vehicle 100. As such, the controller may cause the work vehicle 100 to automatically execute a second task 304 to drive around the bush 120. In some embodiments, the controller 412 may cause the image capturing system 200 to capture image data over time via the camera device 202 to generate a video log in response to the controller 412 receiving an indication to execute the second task 304 (e.g., to drive around the bush 120). In some embodiments, the controller 412 may store the video log.

Figure 2C:
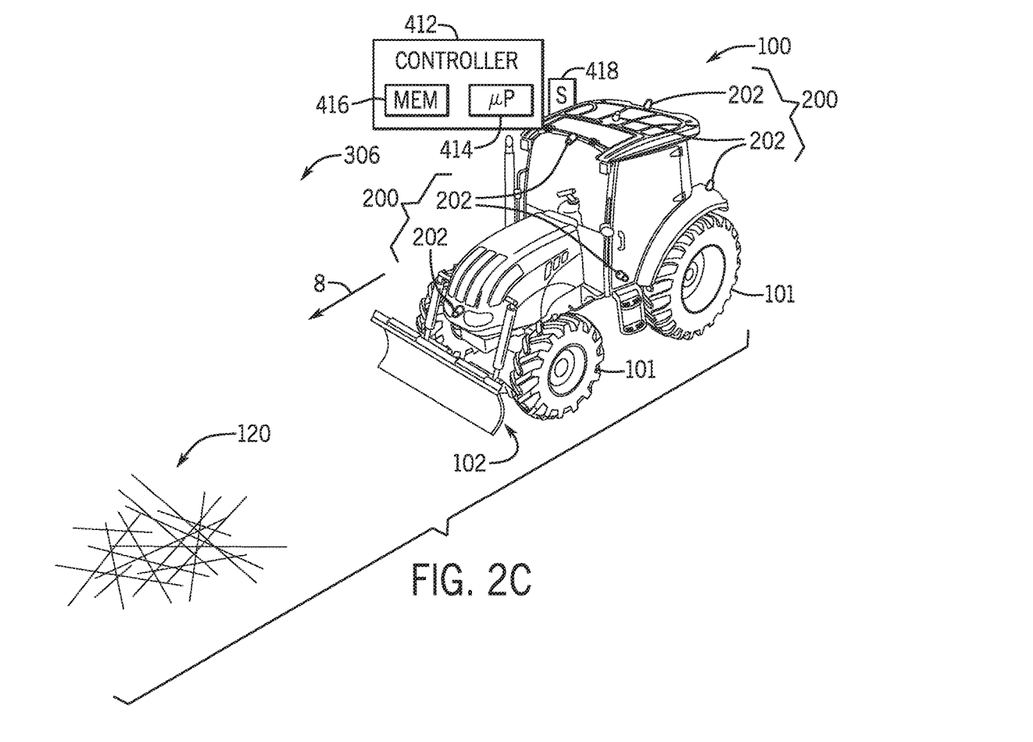
FIG. 2C is a schematic diagram of the work vehicle of FIG. 1 executing a third task in response to a user input, according to an embodiment of the present disclosure.

FIG. 2C is a schematic diagram of the work vehicle 100 of FIG. 1 executing a third task 306 in response to a user input, according to an embodiment of the present disclosure. In some embodiments, the operator may override automatic or highly automated control of the work vehicle 100 (e.g., the first task 302 and/or second task 304) to execute a third task 306. For example, the controller 412 may be configured to cause the work vehicle 100 to automatically stop in response to the sensor assembly 418 identifying the bush 120, or another obstacle, in close proximity to the work vehicle 100. However, in some embodiments, the operator may elect to instead direct the work vehicle 100 toward the bush 120 to, for example, remove the bush 120 with the front tool 102. As such, the operator may override the automatic tasks 302 and 304, and a signal indicative of a user input to override automatic commands may be sent to the controller 418, in which case, the image capturing system 200 may capture image data via the camera devices 202. The controller 412 may generate a video log in response to an operator overriding autonomous task. The controller may also store the video log.

In some embodiments, the image capturing system 200 captures image data in response to a triggering event. For example, the identification of an obstacle (e.g., the bush 120) may serve as a triggering event that may cause the controller 412 to receive image data from the image capturing system 200. The controller may then associate the image data with a corresponding position of the work vehicle to generate a video log in response to the triggering event. Furthermore, in some instances, the execution of a task (e.g., the start or end of a mission) may serve as a triggering event that may cause the controller to receive image data captured by the image capturing system 200. The controller 412 may then associate the image data with a corresponding position of the work vehicle to generate a video log in response to the triggering event. Furthermore, in some instances, when an operator overrides (e.g., disregards) an automatic command or highly automated command to be executed by the processor 414, the controller 412 may receive a signal indicative of a manual user input (e.g., from a user interface, from the hand controller, etc.). The signal indicative of the manual user input may serve as the triggering event that may cause the controller 412 to receive and/or store image data from the image capturing system 200. The controller 412 may then associate the image data with a corresponding position of the work vehicle 100 to generate a video log in response to the triggering event.

In some embodiments, after the controller 412 receives an indication of an obstacle, the controller 412 may categorize the obstacle as "traversable" (e.g., a shadow, small hole in the ground, etc.) or "non-traversable" (e.g., a large tree, a pole, etc.) to execute a suitable task. For example, the controller 412 may determine that the sensor assembly 418 has identified a shadow, in which case the controller 412 may categorize the identified obstacle (e.g., shadow) as traversable and drive over it. As another example, the controller 412 may determine that the sensor assembly 418 has identified a small bush that may be driven over, in which case the controller 412 may categorize the identified obstacle (e.g., small bush) as traversable, but choose not to drive over it, and instead stop or avoid the obstacle. As another example, the controller 412 may determine that the sensor assembly 418 has identified a large tree, in which case the controller 412 may categorize the identified obstacle (e.g., small bush) as non-traversable and stop or avoid the object.

Figure 3:
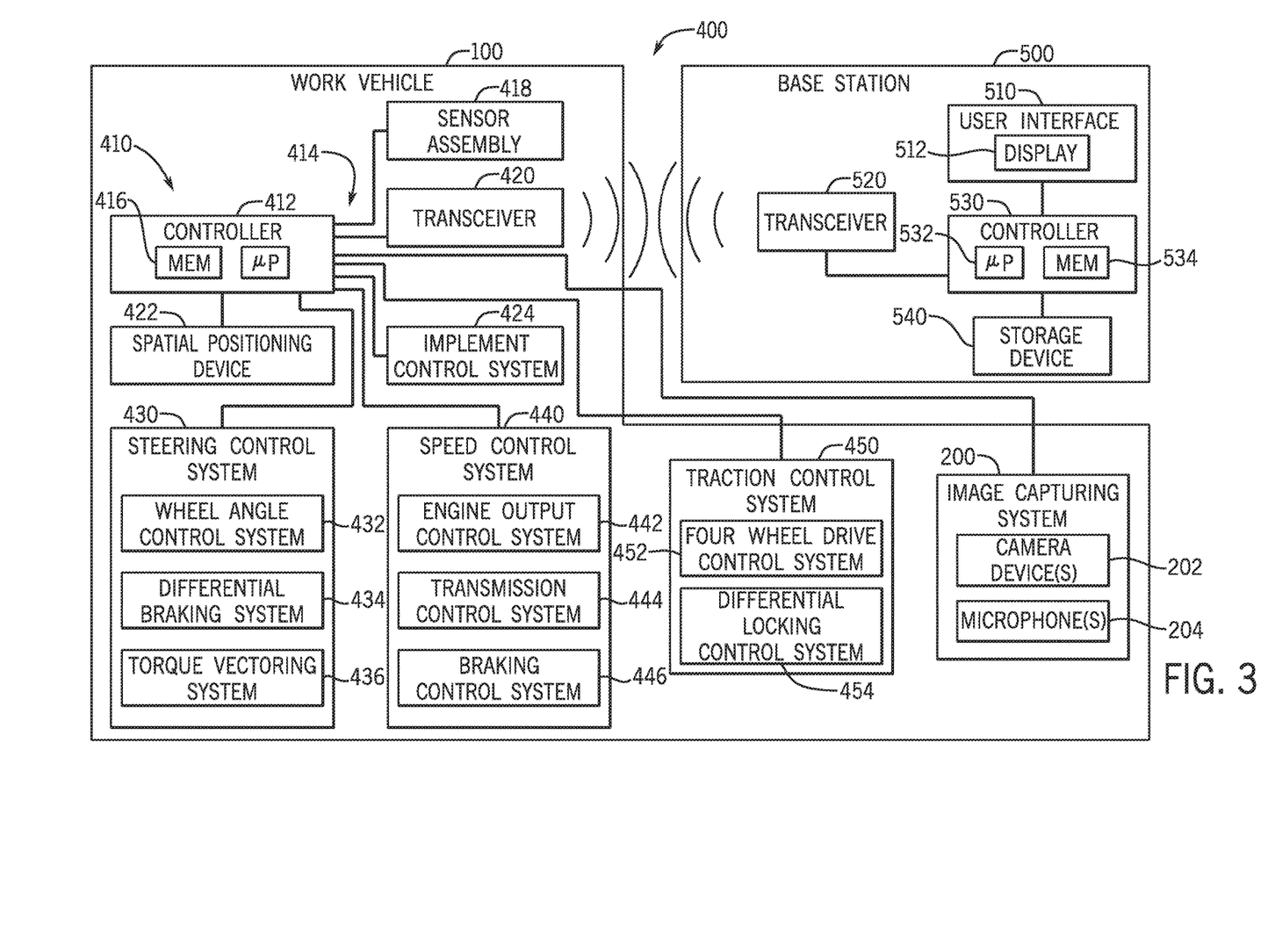
FIG. 3 is a schematic diagram of a control system that may be employed within the work vehicle of FIG. 1 to control the work vehicle, according to an embodiment of the present disclosure.

FIG. 3 is a schematic diagram of a control system 400 that may be employed within the work vehicle 100 of FIG. 1 to control the work vehicle 100, according to an embodiment of the present disclosure. In the illustrated embodiment the control system 400 includes a work vehicle control system 410 mounted on the work vehicle 100. Furthermore, the work vehicle control system 410 includes a first transceiver 420 configured to establish a wireless communication link with a second transceiver 520 of a base station 500. The first and second transceivers may operate at any suitable frequency range within the electromagnetic spectrum. For example, in certain embodiments, the transceivers may broadcast and receive radio waves within a frequency range of about 0.5 GHz to about 10 GHz. In addition, the first and second transceivers may utilize any suitable communication protocol, such as a standard protocol (e.g., Wi-Fi, Bluetooth, etc.) or a proprietary protocol.

In the illustrated embodiment, the work vehicle control system 410 includes the image capturing system 200, which may include one or more camera devices 202 (e.g., or any other suitable image capturing device(s)) mounted on and/or around the work vehicle 100. For example, as described above, the work vehicle 100 may include camera device(s) on the front of the work vehicle, on the lateral sides of the work vehicle, on the roof of the work vehicle, on the rear portion of the work vehicle, or any other suitable position on the work vehicle, or a combination thereof. In some embodiments, the camera device(s) 202 may be configured to capture individual images (e.g., at variable frame rates), video data, audio data, or a combination thereof. For example, the camera device 202 may include a microphone for capturing the audio data in addition to the visual data.

Furthermore, the camera device(s) 202 may be communicatively coupled to the controller 412. In some embodiments, the camera device(s) 202 of the image capturing system 200 may output a first signal indicative of image data to the controller 412. For example, the image capturing system 200 may capture 10 seconds, 30 seconds, 1 minute, 5 minutes, 30 minutes, or any suitable length of image data, such that the image data includes an image stream (e.g., picture(s) and/or video(s)) captured by the camera devices 202. The image data may include a plurality of images captured at any suitable frame rate. Furthermore, the image data may include video data. In some instances, time information and position information is added to the image data to generate the video log. The video log may include image data, position information, time information or any combination thereof. For example, the video log may only include image data that is associated to a corresponding position of the work vehicle (e.g., position data/information), while in other embodiments, the video log may include image data, position information (e.g., data) corresponding position of the work vehicle, and time information (e.g., data) associated with the time the image data was captured.

In some embodiments, the image data may include audio data captured by a microphone 204 of the image capturing system 200. The microphone 204 may include a transducer that converts sound into a signal that is output to the controller 412 for further processing. In some embodiments, the microphone(s) 204 may be positioned in close proximity to respective camera device(s) 202. As such, the image data may include audio data associated with a position of the camera device(s) 202 and microphone(s) 204. Furthermore, each microphone may be a dynamic microphone that may use a coil of wire suspended in a magnetic field to detect air pressure variations of a sound wave, and a signal indicative of the sound wave is output to the controller 412. In some instances, the sound captured by the microphone may be stored in the memory 416 of the controller.

In the illustrated embodiment, the work vehicle 100 includes a spatial positioning device 422, which is mounted to the work vehicle 100 and configured to determine a position of the work vehicle 100. As will be appreciated, the spatial positioning device may include any suitable system configured to determine the position of the work vehicle 100, such as a global positioning system (GPS) or a global navigation satellite system (GNSS), for example. In certain embodiments, the spatial positioning device 422 may be configured to determine the position of the work vehicle 100 relative to a fixed point within the field (e.g., via a fixed radio transceiver). Accordingly, the spatial positioning device 422 may be configured to determine the position of the work vehicle 100 relative to a fixed global coordinate system (e.g., via the GPS) or a fixed local coordinate system. In certain embodiments, the first transceiver 420 is configured to broadcast a signal indicative of the position of the work vehicle 100 to the transceiver 520 of the base station 500.

In addition, the work vehicle 100 may include a sensor assembly 418. In some embodiments, the sensor assembly may facilitate the autonomous control of the work vehicle 100. For example, the sensor assembly 418 may be configured to detect an obstacle in close proximity to the work vehicle 100. The sensor assembly 418 may include one or more sensors (e.g., infrared sensor(s), capacitance sensor(s), ultrasonic sensor(s), magnetic sensor(s), optical sensor(s) etc.), configured to detect the presence or location of an obstacle (e.g., bush 120).

In the illustrated embodiment, the work vehicle control system 410 includes a steering control system 430 configured to control a direction of movement of the work vehicle 100, and a speed control system 440 configured to control a speed of the work vehicle 100. The speed control system 440 and the steering control system 430 may operate independent of one another (e.g., based at least in part on an autonomous control scheme or highly automated control scheme). In addition, the work vehicle 100 includes a traction control system 450 configured to control distribution of power from an engine of the work vehicle 100 to wheels or tracks of the work vehicle 100, and an implement control system 424 configured to control operation of an implement (e.g., towed by the work vehicle 100). Furthermore, the work vehicle control system 410 includes a controller 412 communicatively coupled to the first transceiver 420, to the spatial positioning device 422, to the sensor assembly 418, to the steering control system 430, to the speed control system 440, to the traction control system 450, and to the implement control system 424.

In certain embodiments, the controller 412 is an electronic controller having electrical circuitry configured to process data from the transceiver 420, the spatial positioning device 422, the sensor assembly 418, or a combination thereof, among other components of the work vehicle 100. In the illustrated embodiment, the controller 412 includes a processor 414, such as the illustrated microprocessor, and a memory device 416. The controller 412 may also include one or more storage devices and/or other suitable components. The processor 414 may be used to execute software, such as software for controlling the work vehicle 100, and so forth. Moreover, the processor 414 may include multiple microprocessors, one or more "general-purpose" microprocessors, one or more special-purpose microprocessors, and/or one or more application specific integrated circuits (ASICS), or some combination thereof. For example, the processor 48 may include one or more reduced instruction set (RISC) processors.

The memory device 416 may include a volatile memory, such as random access memory (RAM), and/or a nonvolatile memory, such as ROM. The memory device 416 may store a variety of information and may be used for various purposes. For example, the memory device 416 may store processor-executable instructions (e.g., firmware or software) for the processor 414 to execute, such as instructions for controlling the work vehicle 100. The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., image data, audio data, etc.), instructions (e.g., software or firmware for controlling the work vehicle 100, etc.), and any other suitable data.

In the illustrated embodiment, the steering control system 430 includes a wheel angle control system 432, a differential braking system 434, and a torque vectoring system 436. The wheel angle control system 432 may automatically rotate one or more wheels or tracks of the work vehicle 100 (e.g., via hydraulic actuators) to steer the work vehicle 100 along a path through the field. By way of example, the wheel angle control system 432 may rotate front wheels/tracks, rear wheels/tracks, and/or intermediate wheels/tracks of the work vehicle 100, either individually or in groups. The differential braking system 434 may independently vary the braking force on each lateral side of the work vehicle 100 to direct the work vehicle 100 along the path through the field. Similarly, the torque vectoring system 436 may differentially apply torque from the engine to wheels and/or tracks on each lateral side of the work vehicle, thereby directing the work vehicle along the path through the field. While the illustrated steering control system 430 includes the wheel angle control system 432, the differential braking system 434, and the torque vectoring system 436, it should be appreciated that alternative embodiments may include one or two of these systems, in any suitable combination. Further embodiments may include a steering control system 430 having other and/or additional systems to facilitate directing the work vehicle 100 along the path through the field (e.g., an articulated steering system, etc.).

In the illustrated embodiment, the speed control system 440 includes an engine output control system 442, a transmission control system 444, and a braking control system 446. The engine output control system 442 is configured to vary the output of the engine to control the speed of the work vehicle 100. For example, the engine output control system 442 may vary a throttle setting of the engine, a fuel/air mixture of the engine, a timing of the engine, and/or other suitable engine parameters to control engine output. In addition, the transmission control system 444 may adjust gear selection or transmission input-output ratio within a transmission to control the speed of the work vehicle 100. Furthermore, the braking control system 446 may adjust braking force, thereby controlling the speed of the work vehicle 100. While the illustrated speed control system 440 includes the engine output control system 442, the transmission control system 444, and the braking control system 446, it should be appreciated that alternative embodiments may include one or two of these systems, in any suitable combination. Further embodiments may include a speed control system 440 having other and/or additional systems to facilitate adjusting the speed of the work vehicle 100.

In the illustrated embodiment, the traction control system 450 includes a four wheel drive control system 452 and a differential locking control system 454. The four wheel drive control system 452 is configured to selectively engage and disengage a four wheel drive system 452 of the work vehicle 100. For example, in certain embodiments, the work vehicle 100 may include a four wheel drive system 452 configured to direct engine output to the rear wheels/tracks while disengaged, and to direct engine output to the front wheels/tracks and the rear wheels/tracks while engaged. In such embodiments, the four wheel drive control system 452 may selectively instruct the four wheel drive system 452 to engage and disengage to control traction of the work vehicle 100. In certain embodiments, the work vehicle 100 may include intermediate wheels/tracks positioned between the front wheels/tracks and the rear wheels/tracks. In such embodiments, the four wheel drive control system 452 may also control the transfer of engine power to the intermediate wheels.

In addition, the differential locking control system 454 is configured to selectively engage a differential locking system 454 of at least one locking differential between a respective pair of wheels/tracks. For example, in certain embodiments, a locking differential is positioned between the rear wheels/tracks and configured to transfer engine power to the rear wheels/tracks. While the differential locking system 454 is disengaged, the differential is unlocked. As a result, the rotational speed of one rear wheel/track may vary relative to the rotational speed of the other rear wheel/track. However, when the differential locking system is engaged, the differential is locked. As a result, the rotational speeds of the rear wheels/tracks may be substantially equal to one another. In certain embodiments, a locking differential may be positioned between the front wheels/tracks and/or between intermediate wheels/tracks. In some embodiments, a center differential may lock the drive between the front and rear axles. In certain embodiments, the differential locking control system 454 is configured to independently engage and disengage the differential locking system of each locking differential. While the illustrated traction control system 450 includes the four wheel drive control system 452 and the differential locking control system 454, it should be appreciated that alternative embodiments may include only one of these systems. Further embodiments may include a traction control system 450 having other and/or additional systems to facilitate control of traction of the work vehicle 100.

The implement control system 424 is configured to control various parameters of the agricultural implement towed by the work vehicle 100. For example, in certain embodiments, the implement control system 424 may be configured to instruct an implement controller (e.g., via a communication link, such as a CAN bus or ISOBUS) to adjust a penetration depth of at least one ground engaging tool of the agricultural implement. By way of example, the implement control system 424 may instruct the implement controller to reduce the penetration depth of each tillage point on a tilling implement, or the implement control system 424 may instruct the implement controller to disengage each opener disc/blade of a seeding/planting implement from the soil. Reducing the penetration depth of at least one ground engaging tool of the agricultural implement may reduce the draft load on the work vehicle 100. Furthermore, the implement control system 424 may instruct the implement controller to transition the agricultural implement between a working position and a transport portion, to adjust a flow rate of product from the agricultural implement, or to adjust a position of a header of the agricultural implement (e.g., a harvester, etc.), among other operations.

In certain embodiments, the work vehicle 100 controller 412 may directly control the penetration depth of at least one ground engaging tool of the agricultural implement. For example, the controller 412 may instruct a three-point hitch (e.g., via a three-point hitch controller) to raise and lower the agricultural implement or a portion of the agricultural implement relative to the soil surface, thereby adjusting the penetration depth of the at least one ground engaging tool of the agricultural implement. In addition, the controller 412 may instruct a hydraulic control system to adjust hydraulic fluid pressure to one or more actuators on the agricultural implement, thereby controlling the penetration depth of respective ground engaging tool(s).

As previously discussed, the work vehicle 100 is configured to communicate with the base station 500 via the transceivers 420 and 520. In the illustrated embodiment, the base station 500 includes a base station controller 530 communicatively coupled to the base station transceiver 520. The base station controller 530 is configured to output commands and/or data to the work vehicle 100. For example, the base station controller 530 may output start and stop commands to the controller 412, and/or the base station controller 530 may instruct the work vehicle to follow a selected/planned path through the field.

In certain embodiments, the base station controller 530 is an electronic controller having electrical circuitry configured to process data from certain components of the base station 500 (e.g., the transceiver 520). In the illustrated embodiment, the base station controller 530 includes a processor 532, such as the illustrated microprocessor, and a memory device 534. The processor 532 may be used to execute software, such as software for providing commands and/or data to the work vehicle controller 412, and so forth. Moreover, the processor 532 may include multiple microprocessors, one or more "general-purpose" microprocessors, one or more special-purpose microprocessors, and/or one or more application specific integrated circuits (ASICS), or some combination thereof. For example, the processor 532 may include one or more reduced instruction set (RISC) processors. The memory device 534 may include a volatile memory, such as random access memory (RAM), and/or a nonvolatile memory, such as ROM. The memory device 534 may store a variety of information and may be used for various purposes. For example, the memory device 534 may store processor-executable instructions (e.g., firmware or software) for the processor 532 to execute, such as instructions for providing commands and/or data to the work vehicle controller 412.

In the illustrated embodiment, the base station 500 includes a user interface 510 communicatively coupled to the base station controller 530. The user interface 510 is configured to present data from the work vehicle 100 and/or the agricultural implement to an operator (e.g., data associated with operation of the work vehicle 100, data associated with operation of the agricultural implement, etc.). The user interface 510 is also configured to enable an operator to control certain functions of the work vehicle 100 (e.g., starting and stopping the work vehicle 100, instructing the work vehicle 100 to follow a selected/planned route through the field, etc.). In the illustrated embodiment, the user interface includes a display 512 configured to present information to the operator, such as the position of the work vehicle 100 within the field, the speed of the work vehicle, the path of the work vehicle, and the video log generated by the image capturing system 200, among other data. In addition, the user interface 510 (e.g., via the display 512, via an audio system, etc.) is configured to alert an operator if an obstacle (e.g., bush) is detected. Furthermore, in certain embodiments, the user interface 510 may alert the operator that an automatic mission is being generated, and/or the start and/or end of a mission.

In the illustrated embodiment, the base station 500 includes a storage device 540 communicatively coupled to the base station controller 530. The storage device 540 (e.g., nonvolatile storage) may include read-only memory (ROM), flash memory, a hard drive, or any other suitable optical, magnetic, or solid-state storage medium, or a combination thereof. The storage device(s) may store data (e.g., the video log, image data, etc.), instructions (e.g., software or firmware for commanding the work vehicle 100, etc.), and any other suitable data.

In some embodiments, the image capturing system 200 may be communicatively coupled to the base station 500, such that the image capturing system 200 may send image data (e.g., captured by the camera device(s) 202 and/or any other suitable image capturing device(s)) to the base station 500. In some embodiments, the image data is first sent to the work vehicle controller 412 before being sent to the base station controller 530 via transceivers 420 and 520. The image data sent to the base station 500 may be encrypted to, for example, block unauthorized access. As a further example, the encrypting of the image data sent to the base station 500 from the image capturing system 200 may reduce the likelihood of manually altering the data. In some embodiments, the image data may be sent to the base station controller 530. The base station controller may then generate a video log. The base station controller 530 may then associate the image data with a corresponding position of the work vehicle 100 to generate a video log, for example, in response to the triggering event. Furthermore, in some embodiments, the video log may be generated by the work vehicle controller 412 (e.g., in response to a triggering event) and sent to the base station controller 530 for storage the storage device 540. In some embodiments, the work vehicle 100 may include a storage device 540 and may store the video log in the storage device 540.

While the control system 410 of the work vehicle 100 includes the controller 412 in the illustrated embodiment, it should be appreciated that in alternative embodiments, the control system 410 may include the base station controller 530. For example, in certain embodiments, control functions of the control system 410 may be distributed between the work vehicle controller 412 and the base station controller 530. In further embodiments, the base station controller 530 may perform a substantial portion of the control functions of the control system 410. In addition, the base station controller 530 may output instructions to the work vehicle controller 412 (e.g., via the transceivers 420 and 520), instructing the work vehicle 100 and/or the agricultural implement to perform certain operations (e.g., instructions to reduce the penetration depth of at least one ground engaging tool of the agricultural implement, instructions to stop the work vehicle 100, etc.). Furthermore, in some embodiments, the work vehicle 100 may include a user interface including the hand controller 105. The user interface may be configured to receive a user input (e.g., input from the operator of the work vehicle 100) to, for example, override or disregard an autonomous command of the work vehicle or perform another suitable manual task.

In certain embodiments, the controller 412 is configured to receive image data from the image capturing system 200 in response to a triggering event. In such embodiments, the controller 412 may be configured to output a signal indicative of a video log. That is, the controller 14 may associate the image data with a corresponding position of the work vehicle 100 to generate a video log in response to the triggering event. The video log may include image data captured by the camera device(s) 202 of the image capturing system 200, such that the video log extends from a first time to a second time. The video log has a duration between a first time and a second time. In some instances, the first time corresponds to a first duration before the triggering event, and the second time corresponds to a second duration after the triggering event.

Figure 4:
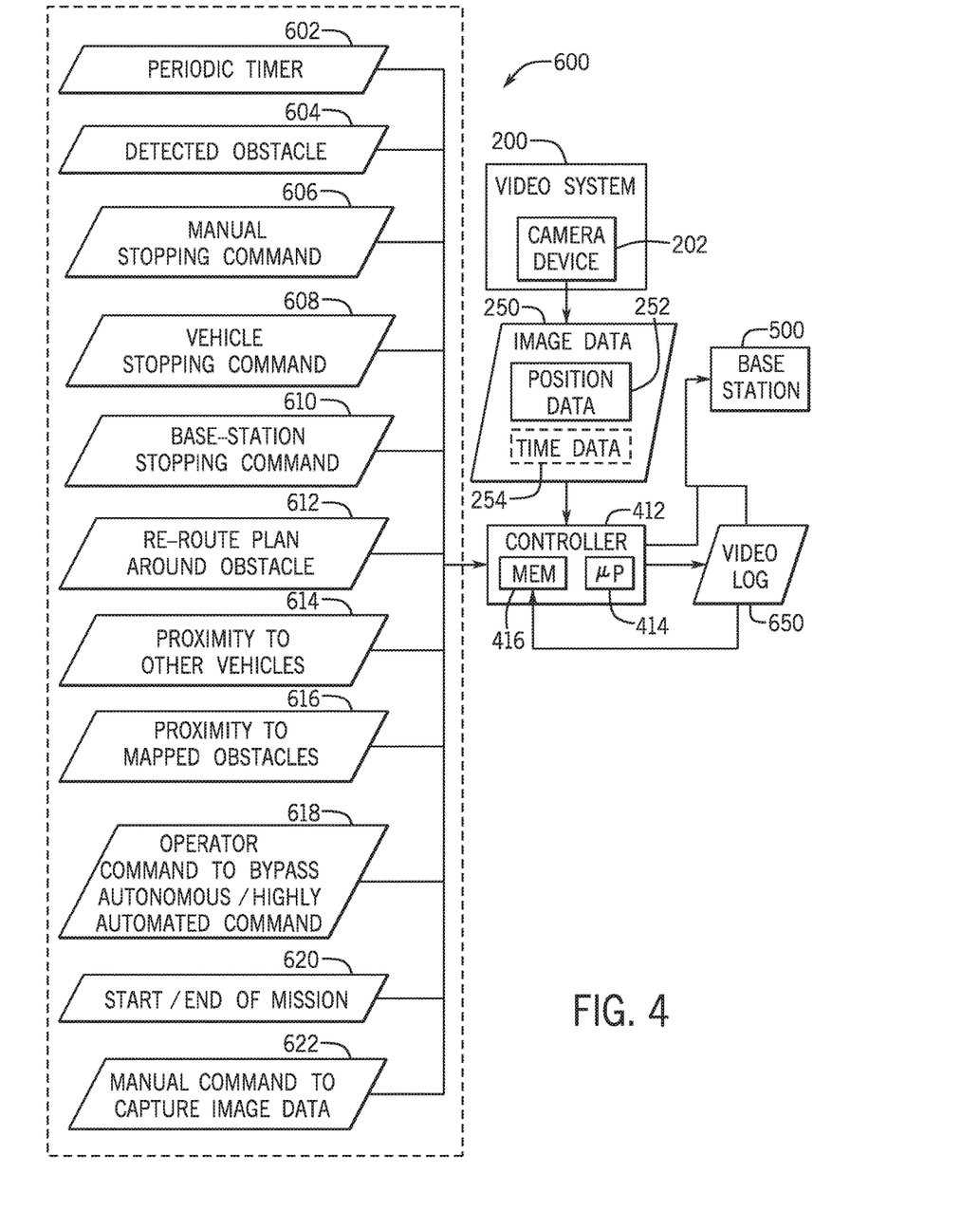
FIG. 4 is a block diagram of triggering events that may cause the image capturing system of the work vehicle of FIG. 1 to capture image data, according to an embodiment of the present disclosure.

FIG. 4 is a block diagram of triggering events 600 that may cause the image capturing system 200 of the work vehicle to capture image data 250. In some embodiments, the image capturing system 200 may capture image data 250 via the camera device 202 in response to a triggering event 600. As such, the image data 250 may be output to the controller 412 to be stored in memory 416 and/or be processed by the processor 414. In some embodiments, after receiving the image data 250, the controller may generate a video log 650, which may include the image data 250, position data 252, and, in certain embodiments, the time data 254 captured by the camera devices 202. In some instances, the video log 650 may include image data from a first time to a second time. The first time may correspond to a first duration before the triggering event 600, and the second time may correspond to a second duration after the triggering event 600. As such, in some embodiments, the video log 650 may include image data from a time before the triggering event 600.

It should be appreciated that in alternative embodiments, the video log 650 may begin at a time after the triggering event 650. Furthermore, as mentioned above, the image data may be encrypted to, for example, block unauthorized access. As a further example, the encrypting of the image data sent to the base station 500 from the image capturing system 200 may reduce the likelihood of manually altering the data. As such, in some embodiments, the encryption of the image data 250 may increase the integrity of the video log 650. Furthermore, in some embodiments, the video log may be generated and encrypted by the work vehicle controller 412 (e.g., in response to a triggering event) and sent to the base station controller 530 for storage on the storage device 540. In some embodiments, the work vehicle 100 may include a storage device 540 and may store the encrypted video log 650 in the storage device 540

The controller 412 may receive image data 250 from the camera device 202, in response to receiving a signal indicative of an expiration of a periodic timer 602. For example, in some embodiments, a signal indicative of a periodic timer 602 may be output to the controller 412, thereby initiating the capturing of image data 250. The signal indicative of an expiration of a periodic timer 602 may be output to the controller 412 at any time intervals, such as every 1 minute, every 2 minutes, every 30 minutes, every 2 hours, every 8 hours, and the like, or any combination thereof. In some instances, the controller 412 may do the timing. For example, the controller 412 may periodically receive image data (e.g., without external timer signals).

In addition, the triggering event 600 may include a signal indicative of a detected obstacle 604, as described above with regards to FIGS. 2A, 2B, and 2C. In some embodiments, the signal indicative of the detection of the obstacle may be output from the sensor assembly. For example, the detection of the obstacle may be based on a threshold distance from the work vehicle, such that when the distance between the sensor assembly and the obstacle is less than the threshold distance, the controller 412 receives the image data 250, generates the video log 650, and stores the video log 650. For example, the controller 412 may receive a signal indicative of a detected obstacle 604 and, in response, may cause the image capturing system 200 to capture image data 250, generate the video log 650, and store the video log 650. The signal indicative of obstacle detection may include the obstacle detected or the position of the obstacle, such that the controller may compare the position to the threshold distance to detect the obstacle.

Furthermore, in some embodiments, the detection of an obstacle may the work vehicle controller 412 to re-route the plan to avoid the obstacle. As such, in some embodiments, the signal indicative of a re-route plan around the obstacle 612 may serve as the triggering event 600. For example, the controller 412 may cause the work vehicle 100 to execute a re-route plan to avoid an obstacle (e.g., via a determined route for the work vehicle 100, etc.) in response to receiving the signal indicative of the re-route plan around an obstacle 612. In some instances, upon receiving the signal indicative of a re-route plan around an obstacle 612, the controller 412 may cause the image capturing system 200 to capture image data 250. In some embodiments, the re-route plan may not be a signal, but instead triggered within the controller 412. Furthermore, the re-route plan may be triggered by factors other than an obstacle detection. The controller 412 may then generate a video log 650 and store the video log 650.

In some embodiments, the controller 412 may receive image data 250, position data 252, and/or time data 254. The video log 650 may be generated based at least on the received image data 250, position data 252, and/or the time data 254.

In some embodiments, the triggering event 600 may include a signal indicative of a manual stopping command 606 and/or a signal indicative of an operator command to override an autonomous command and/or high automated command 618. In some embodiments, the signal indicative of a manual stopping command 606 and the signal indicative of an operator command to override an autonomous command and/or high automated command 618 may input to a user interface. For example, the use interface may include a physical button labeled "STOP" and/or a virtual button on a display labeled "STOP." When the operator engages the "STOP" button, a signal indicative of a manual stopping command may be output to the controller 412, which may instruct the working vehicle 100 to stop (e.g., via the speed control system 440). As such, upon receiving the signal indicative of a manual stopping command 606 and/or a signal indicative of an operator command to override an autonomous command 618 the controller 412 may cause the image capturing system 200 to capture image data 250, generate the video log 650, and store the video log 650 (e.g., on a storage device 540 of the work vehicle 100 or the base station 500).

In some embodiments, the manual stopping command may be a signal indicative of a base station stopping command 610. That is, a base station operator may send a user input to a user interface of the base station 500 to send a manual stopping command (e.g., a signal indicative of a base station stopping command 610) to the controller 412. In some embodiments, the manual stopping command may be received by the user interface and may override an autonomous command. As such, the manual stopping command may serve as the triggering event 600 that causes the controller 412 to capture image data 250, generate a video log 650, and store the video log 650.

In some embodiments, the triggering event 600 may be a signal indicative of a vehicle stopping command 608 to decelerate and/or bring the work vehicle 100 to a stop (e.g., by altering the speed control system 440). In some embodiment, the signal indicative of a vehicle stopping command 608 may output from a component of an autonomous control system. For example, when a large force is detected by the sensor assembly (e.g., due to the work vehicle encountering a mound of dirt, thereby causing the work vehicle to experience a vertical force), the controller 412 may receive a signal indicative of a vehicle stopping command 608. As such, the signal indicative of the vehicle stopping command 608 may serve as the triggering event 600. As such, upon receiving the signal indicative of a vehicle stopping command 608, the image capturing system 200 may capture image data 250, generate the video log 650, and store the video log 650. In alternative embodiments, instead of receiving a signal, the controller 412 may instruct the speed control system 440 to stop the vehicle thereby causing the controller 412 to capture image data 250, generate a video log 650, and store the video log 650.

In some embodiments, the triggering event 600 may include a signal indicative of a proximity to other (e.g., autonomous) work vehicles or any other moving objects (e.g., vehicles). In some instances, the work vehicles and/or moving objects may include a spatial positioning device 422 as mentioned above. The spatial positioning device may monitor the position of the work vehicles and/or the moving objects. In some embodiments, the controllers of the work vehicles and/or moving objects may be communicatively coupled to one another (e.g., via transceivers), such that the controllers may be able to receive signals indicative of a proximity 614 of the work vehicles and/or moving objects to one another (e.g., by comparing the position of the work vehicle to the position of another work vehicle/moving object). For example, a work vehicle may receive signals indicative of the position of the other work vehicles and/or moving objects. The controller 412 of the work vehicle may determine if the distance between the work vehicle to other work vehicles/moving objects is below a threshold distance. If the work vehicle is below a threshold distance from other work vehicles and/or moving objects, the controller 412 may capture image data 250 used to generate (e.g., and store) the video log 650.

In certain embodiments, a signal indicative of proximity to a mapped obstacle 616 may serve as a triggering event 600, whereby the controller 412 may cause the image capturing system 200 to capture image data 250 and generate a video log 650. In some instances, a map of the environment surrounding the work vehicle may (e.g., a mapped environment) be stored in memory 416. The spatial positioning device 422 monitor the position of the work vehicle 100 within the mapped environment. In some embodiments, when a signal indicative of a proximity to mapped obstacles 616 (e.g., in the mapped environment) is received by the controller 412, the controller 412 may capture image data 250 to generate and store a video log 650. For example, the controller 412 may receive a signal of the position of the work vehicle 100. The controller 412 may then compare the position of the work vehicle 100 to a position of an obstacle on the map. If the proximity of the work vehicle to the obstacle on the map is less than a threshold distance, the controller 412 may receive image data 250 to generate and store the video log 650.

Further, in some embodiments, the controller 412 may receive a signal indicative of a triggering event 600 when the controller 412 receives a signal indicative of a start and/or end of a mission 620. For example, in some embodiments, a signal indicative of a start of a mission 620 may be received by the controller 412 in response to activation of the work vehicle 100, and in some embodiments, a signal indicative of an end of a mission 620 may be received by the controller 412 in response to deactivating the work vehicle 100. In other embodiments, the memory 416 may store missions that the work vehicle may execute. When the missions stored in memory 416 are executed, the controller 412 may receive image data to generate (e.g., and store) the video log 650. In some embodiments, the signal to start/end a mission may come from the base station 500.

In some embodiments, an operator may make a selection on the user interface of the work vehicle (or the user interface of the base station 500) to capture image data 622. Upon making the manual selection to capture image data (e.g., via pressing a button), the controller 412 may receive a signal indicative of a command to capture image data 622. As such, the controller 412 may capture image data 250, generate a video log 650, and store the video log 650.

In certain embodiments, the controller 412 may capture image data 250, generate a video log 650, and store the video log 650 in response any of the above mentioned triggering events 600. For example, in some embodiments, the controller 412 may be configured to capture image data 250 in response to receiving a signal indicative of an expiration of a periodic timer 602 and/or a signal indicative of an operator command to override an autonomous command 618 and generate a video log 650 that may be stored in a storage device 540 or any memory device. In further embodiments, any of the triggering events 600 may cause the controller 412 to receive image data 250 and generate the video log 650.

Figure 5:
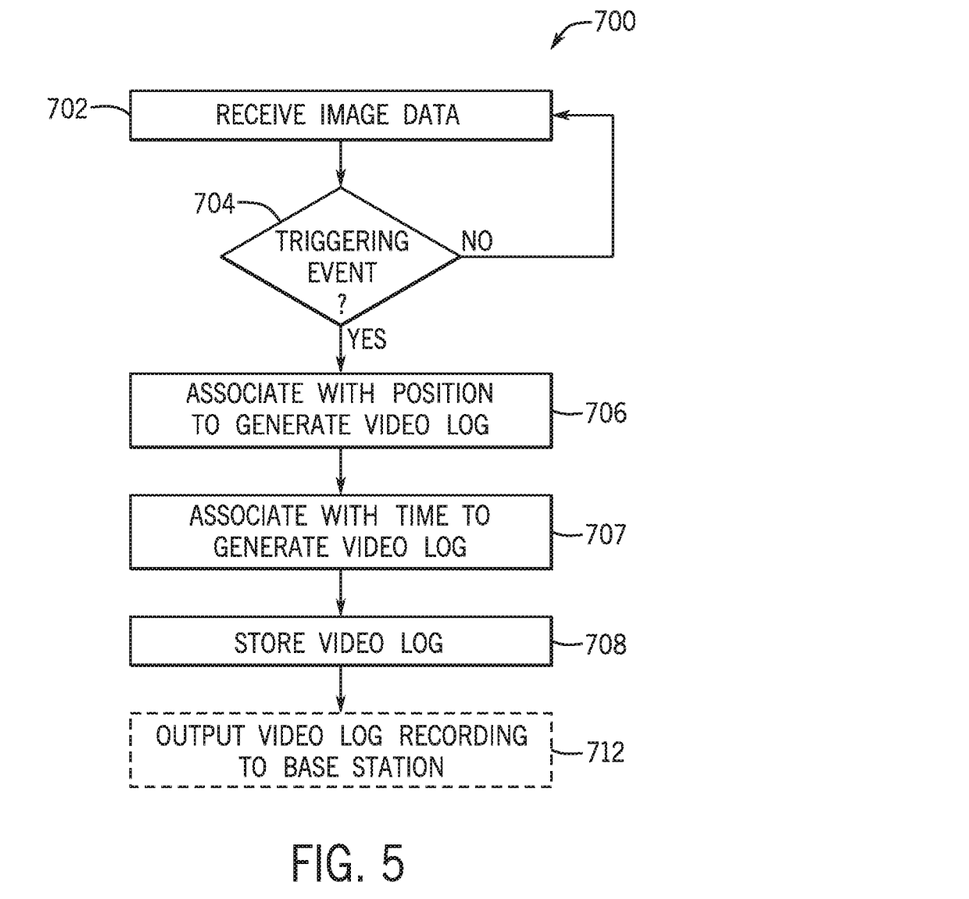
FIG. 5 is a flow diagram of a method whereby image data retrieved by the image capturing system is stored and associated with a position and time, according to an embodiment of the present disclosure.

FIG. 5 is a flow diagram 700 of a method whereby image data retrieved by the image capturing system is stored and associated with a position and time, according to an embodiment of the present disclosure. That is, upon receiving image data from the image capturing system, the controller may store the image data and associate it with a position (e.g., determined by the spatial positioning device) and time (e.g., determined by the controller). The controller may receive image data (process block 702) and identify if a triggering event is present (decision block 704). When the controller identifies a triggering event, the controller may associate the received image data with position (process block 706) and/or time (process block 707). The controller may then store (e.g., in memory) the image data indicative of the triggered event (process block 708). In some embodiments, the controller may initiate the recording of a video log. Furthermore, the controller may then send the video log to the base station (process block 712).

For example, the controller may receive image data (process block 702) from the camera device of the image capturing system. In some embodiments, the controller may receive image data regardless of whether a triggering event is identified. After the image data is received, the image data may be stored (e.g., in the memory) for any suitable time duration. For example, in some embodiments, the controller may store image data for 1 minute, 30 minute, 1 hour, 5 hours, 24 hours, or any suitable length of time. For example, the controller may store a set of image data that extends from a time before the current time to the current time (e.g., in which the set of image data is periodically updated). In some embodiments, the image data may be associated with time and/or position during the storing process. In some embodiments, the image data may be received in response to a triggering event.

Furthermore, the controller may identify whether a triggering event has occurred (decision block 704). In some embodiments, the controller may receive a signal indicative of a triggering event. For example, the controller may identify any of the triggering events discussed above with regards to FIG. 4. It should be appreciated that in additional embodiments, the controller may identify whether any other suitable triggering events have occurred (e.g., by receiving an indication of a triggering event). When a triggering event is not identified, the controller may continue to receive image data (process block 702). As mentioned above, in some embodiments, the triggering event may be generated by the controller (e.g., via a periodic timer) instead of received.

When a triggering event is identified by the controller, the controller may associate the image data with a corresponding position to generate a video log (process block 706). In some embodiments, after the triggering event is identified by the controller, the image data received during, and in some embodiments, before and/or after, the triggering event may be associated with the position of the work vehicle (e.g., and the time of the triggering event between a first time before the triggering event and a second time after the triggering event, etc.) and the time during which the image data was received by the controller. As mentioned above, in some instances the controller may receive the position from the spatial positioning device, and the time may be tracked by an internal clock of the controller. In certain embodiments, the spatial positioning system (e.g., GPS and/or the GNSS)

of the work vehicles may include internal clocks that may provide time indications to a work vehicle and be synchronized between the systems on the multiple work vehicles. In some embodiments, the association of the image data with the time data to generate the video log may (process block 707) may also be performed by the work vehicle controller or base station controller.

The storing of the video log (process block 708) may be performed by the work vehicle controller and/or the base station controller. In some embodiments, the controller may store the video log and associated image data on an internal memory. In some instances, the controller may store the image data on the base station. In some instances the storage of the image data may be encrypted, as mentioned above, to reduce the likelihood of manually altering the data.

In some instances, storing the associated image data indicative of a triggered event may include initiating a recording of a video log. Initiating the recording of the video log may be performed by the controller of the base station and/or the controller of the work vehicle. The video log may include the image data (e.g., associated to position and/or time). Furthermore, the video log may include image data captured by the cameras of the image capturing system. The video log may have a duration between a first time and a second time. In some instances, the first time corresponds to a first duration before the triggering event, and the second time corresponds to a second duration after the triggering event. For example, a triggering event occur at 2:00 pm and end at 2:30 pm (e.g., 30 minutes later), but a video log may be generated from 1:58 pm until 2:35 pm because the first time duration may be 2 minutes (e.g., or any suitable first time before the start triggering event) and the second time duration may be 5 minutes (e.g., or any suitable second time duration after the start of the triggering event).

Furthermore, in some instances, after the recording of the video log 650 has been initiated, the video log may be output to the base station 500 (process block 712) by the work vehicle controller. As mentioned above, the work vehicle controller may be communicatively coupled to the base station controller via respective transceivers. The video log (e.g., or any data sent to the base station or stored in the work vehicle controller) may be encrypted to reduce the likelihood of manually altering the data.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A controller for a work vehicle, comprising:
a processor;
a memory device communicatively coupled to the processor and configured to store instructions configured to cause the processor to:
receive a first signal from an image capturing device, wherein the first signal is indicative of image data associated with an environment of the work vehicle;
associate the first signal with a corresponding position of the work vehicle to generate a video log in response to a triggering event, wherein the video log has a duration between a first time and a second time, and the triggering event comprises a command to stop the work vehicle, a command to start a mission, a command to end a mission, a user input to override an autonomous command, a user input to override a highly automated command, detection of an obstacle, or any combination thereof.

2. The controller of claim 1, wherein the memory is configured to store instruction configured to store the video log and associated first set of signals with the corresponding position.

3. The controller of claim 1, wherein the memory is configured to store instruction configured to instruct a display to present the video log and an associated time.

4. The controller of claim 1, wherein the first time corresponds to a first duration before the triggering event, and the second time corresponds to a second duration after the triggering event.

5. The controller of claim 1, wherein the triggering event comprises expiration of a periodic timer, a command to avoid an obstacle, a manual command to generate the video log, or any combination thereof.

6. The controller of claim 1, wherein the detection of the obstacle is based on a threshold distance between the obstacle and the work vehicle.

7. The controller of claim 1, wherein the user input to override the autonomous command or the highly automated command is received from a user interface of the work vehicle, wherein the autonomous command is based on a second signal indicative of the detection of an obstacle.

8. The controller of claim 1, wherein the memory is configured to store instruction configured to communicatively couple the controller to a base station controller.

9. The controller of claim 8, wherein the memory is configured to store instruction configured to output an encrypted signal indicative of the video log to the base station controller.

10. The controller of claim 1, wherein the instruction to cause the processor to associate the first signal with the corresponding position of the work vehicle comprises instructions to cause the processor to associate the first signal with the corresponding position and a corresponding time.

11. A video system of a work vehicle, comprising:
an image capturing device configured to output a first signal indicative of image data associated with an environment of the work vehicle;
a controller comprising a memory device communicatively coupled to a processor, wherein the memory device is configured to store instructions configured to cause the processor to:
receive a first signal from an image capturing device, wherein the first signal is indicative of image data associated with an environment of the work vehicle; and
associate the first signal with a corresponding position of the work vehicle to generate a video log in response to a triggering event, wherein the video log has a duration between a first time and a second time, and the triggering event comprises a command to stop the work vehicle, a command to start a mission, a command to end a mission, a user input to override an autonomous command, a user input to override a highly automated command, detection of an obstacle, or any combination thereof.

12. The video system of claim 11, wherein image capturing device comprises an infrared spectrum camera, a visual spectrum camera, or any combination thereof.

13. The video system of claim 11, comprising a sensor assembly configured to output a second signal indicative of detection of an obstacle.

14. The video system of claim 13, wherein the sensor assembly comprises an infrared sensor, a capacitance sensor, an ultrasonic sensor, or any combination thereof.

15. The video system of claim 11, wherein the memory is configured to store instructions configured to receive a second signal indicative of a triggering event.

16. The video system of claim 11, wherein the memory is configured to store instruction configured to store the video log.

17. The video system of claim 11, wherein the instruction to cause the processor to associate the first signal with the corresponding position of the work vehicle comprises instructions to cause the processor to associate the first signal with the corresponding position and a corresponding time.

18. A tangible, non-transitory, and computer-readable medium having instructions stored thereon that, when executed by a processor, are configured to cause the processor to:

receive a first signal from an image capturing device, wherein the first signal is indicative of image data associated with an environment of the work vehicle; and associate the first signal with a corresponding position of the work vehicle to generate a video log in response to a triggering event, wherein the video log has a duration between a first time and a second time, and the triggering event comprises a command to stop the work vehicle, a command to start a mission, a command to end a mission, a user input to override an autonomous command, a user input to override a highly automated command, detection of an obstacle, or any combination thereof.

19. The tangible, non-transitory, and computer-readable medium of claim 18, wherein the instructions are configured to store an encrypted signal indicative of the video log.

20. The tangible, non-transitory, and computer-readable medium of claim 18, wherein the first time corresponds to a first duration before the triggering event, and the second time corresponds to a second duration after the triggering event.

* * * * *